(12) United States Patent
Matsumoto

(10) Patent No.: US 10,720,225 B2
(45) Date of Patent: Jul. 21, 2020

(54) INFORMATION PROCESSING APPARATUS, CONTROL METHOD THEREOF, AND STORAGE MEDIUMMD

(71) Applicant: CANON KABUSHIKI KAISHA, Tokyo (JP)

(72) Inventor: Akihiro Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/131,474

(22) Filed: Sep. 14, 2018

(65) Prior Publication Data

US 2019/0088350 A1  Mar. 21, 2019

(30) Foreign Application Priority Data

Sep. 21, 2017  (JP) ................................ 2017-181474

(51) Int. Cl.
| | |
|---|---|
| *G11C 11/34* | (2006.01) |
| *G11C 29/44* | (2006.01) |
| *G11C 16/10* | (2006.01) |
| *G06F 21/44* | (2013.01) |
| *G06F 21/62* | (2013.01) |
| *G11C 16/22* | (2006.01) |
| *G11C 29/52* | (2006.01) |
| *G11C 29/04* | (2006.01) |

(52) U.S. Cl.
CPC .......... *G11C 29/4401* (2013.01); *G06F 21/44* (2013.01); *G06F 21/6209* (2013.01); *G11C 16/10* (2013.01); *G11C 16/105* (2013.01); *G11C 16/22* (2013.01); *G11C 29/52* (2013.01); *G11C 2029/0407* (2013.01); *G11C 2029/4402* (2013.01)

(58) Field of Classification Search
CPC ...... G06F 21/44; G06F 21/6209; G11C 16/10
USPC ................................... 365/185.94
See application file for complete search history.

(56) References Cited

U.S. PATENT DOCUMENTS

| | | | |
|---|---|---|---|
| 8,509,014 B2* | 8/2013 | Shvydun | G11C 29/4401 365/154 |
| 9,900,310 B2* | 2/2018 | Brickell | H04L 63/0876 |
| 9,960,914 B2* | 5/2018 | Oshida | H04L 9/0866 |
| 10,210,089 B2* | 2/2019 | Herrmann | G06F 12/084 |
| 2013/0021859 A1* | 1/2013 | Shvydun | G11C 29/4401 365/200 |
| 2017/0147450 A1* | 5/2017 | Takemura | G06F 11/1471 |
| 2017/0148237 A1* | 5/2017 | Iwaasa | G07C 5/0841 |

FOREIGN PATENT DOCUMENTS

JP  2015-069403 A  4/2015

\* cited by examiner

*Primary Examiner* — Hoai V Ho
*Assistant Examiner* — Minh Dinh
(74) *Attorney, Agent, or Firm* — Venable LLP

(57) ABSTRACT

The present information processing apparatus is provided with a flash memory divided into a plurality of areas based on characteristics of information to be stored therein. The present information processing apparatus detects a problem in data stored in each area using a different method for each area, and repairs the detected problem using a different method for each area.

15 Claims, 13 Drawing Sheets

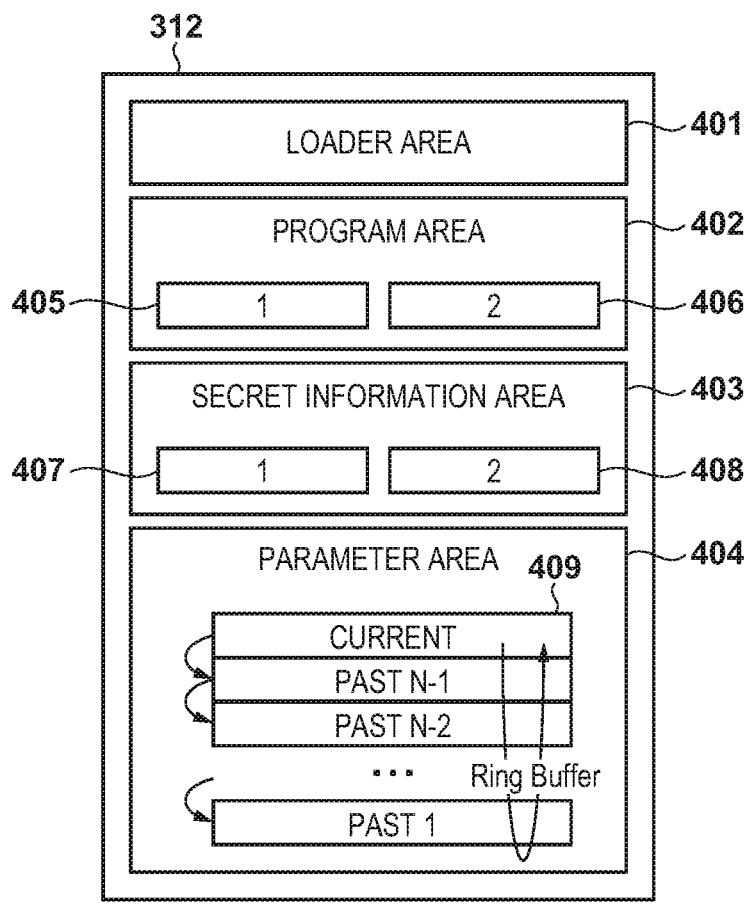

| No. | COMMAND | FUNCTIONAL OVERVIEW |
|---|---|---|
| 01h | INSTALL SECRET INFO | INSTALLATION OF VARIOUS TYPES OF AUTHENTICATION INFORMATION |
| 02h | GET STATUS | ACQUISITION OF INTERNAL STATUS OF BRIDGE IC |
| C0h | REQUEST CHA_C0 | CHALLENGE REQUEST FOR HOST VERIFICATION FROM BRIDGE |
| C1h | SEND RES_C0 | SENDING OF RESPONSE FOR HOST VERIFICATION FROM BRIDGE |
| C2h | REQUEST CHA_C1 | CHALLENGE REQUEST FOR BRIDGE VERIFICATION FROM HOST |
| C3h | SEND RES_C1 | SENDING OF RESPONSE FOR BRIDGE VERIFICATION FROM HOST |
| C4h | REQUEST CHA_C3 | REQUEST FOR AUTHENTICATION FOR SECRET INFORMATION OUTPUT |
| C5h | SEND RES_C3 | ACQUISITION OF RESULT OF SECRET INFORMATION OUTPUT AUTHENTICATION |
| 0Ah | EXPORT CSP | BACKUP OF SECRET INFORMATION |

| No. | COMMAND | FUNCTIONAL OVERVIEW |
|---|---|---|
| 02h | GET STATUS | ACQUISITION OF INTERNAL STATUS OF BRIDGE IC |
| 2Ah | CHANGE TO NonSecure | REQUEST FOR STATE TRANSITION TO NON-SECURE STATE |
| 03h | ERASE SECRET INFO | DELETE VARIOUS TYPES OF AUTHENTICATION INFORMATION |
| 01h | INSTALL SECRET INFO | INSTALLATION OF VARIOUS TYPES OF AUTHENTICATION INFORMATION |
| C6h | REQUEST CHA_C4 | REQUEST FOR AUTHENTICATION FOR SECRET INFORMATION INPUT |
| C7h | SEND RES_C4 | ACQUISITION OF RESULT OF SECRET INFORMATION INPUT AUTHENTICATION |
| 0Bh | IMPORT CSP | UPDATE OF SECRET INFORMATION |
| CAh | REQUEST CHA_C6 | REQUEST FOR AUTHENTICATION FOR PROGRAM INPUT |
| CBh | SEND RES_C6 | ACQUISITION OF RESULT OF PROGRAM INPUT AUTHENTICATION |
| 0Ch | UPDATE PROGRAM | UPDATE OF PROGRAM |

INFORMATION PROCESSING APPARATUS, CONTROL METHOD THEREOF, AND STORAGE MEDIUMMD

BACKGROUND OF THE INVENTION

Field of the Invention

The present invention relates to an information processing apparatus, a control method thereof, and a storage medium.

Description of the Related Art

In recent years, flash memories have been developed as high-capacity, low-cost, and high-speed memories, and in view of the advantages of rewritable nonvolatile memories, such flash memories are widely used in embedded devices such as printer devices, which serve as information processing apparatuses. For example, flash memories are used in the form of general-purpose devices such as various types of memory cards, eMMCs (embedded Multi Media Cards), and SSDs (Solid State Drives) or in the multichip or embedded form in which they are built in an ASIC (custom IC). Particularly, the latter type of flash memory built in the ASIC is used as a security chip because a program and secret information stored in the flash memory are robust against sniffing or falsification, and chips with various types of security authentication are gradually becoming widespread.

Meanwhile, flash memories have drawbacks such as possible sector faults, data loss, or corruption that may be caused by an event resulting from flash memory-specific characteristics such as service duration or restriction in the data retention period, or by a natural disaster or human-induced event such as instantaneous interruption or electrostatic noise. Here, it is difficult to determine whether or not partial loss or corruption of stored data is caused by an artificial falsification. An additional determination program needs to be embedded for analysis, and in the general security level, partial loss or corruption is usually determined to be caused by both artificial and natural falsifications.

Japanese Patent Laid-Open No. 2015-69403 has proposed a method for checking genuineness (integrity) of a program and detecting a falsification (including a failure) when starting a system. Specifically, the genuineness is determined by calculating a hash value of a program area stored in a flash memory at the time of the start, and comparing the calculated hash value with a value stored in advance. It works such that, if the result of the determination indicates that there is a falsification (failure), the system will be started from a ROM (Read Only Memory), which is a separate device. Accordingly, even if there is a falsification or a failure in the program, the system can be started as usual, and both security and user's convenience can be realized.

However, the above-described conventional technique has the following problems. For example, in the above-described conventional technique, a redundant memory device needs to be installed. If the redundant memory device is a chip having a flash memory built in an ASIC, the flash memory and a mask ROM need to be installed inside the chip, resulting in an increase in the chip unit price. Furthermore, the mask ROM that is built in the ASIC is small, and thus it is typically difficult to install a large complicated program into the mask ROM. There is also the problem that, for example, if an existing program is subjected to upgrade or repair due to a market trouble or the like, the program may degrade and inconsistency may be caused. Furthermore, if the ASIC is a security chip, secret information unique to each individual chip is stored in the flash memory, and thus when the system is started without the secret information, it is not possible to normally read out existing data stored in an HDD (Hard Desk Drive) or SSD.

SUMMARY OF THE INVENTION

The present invention enables realization of a robust mechanism that, even if a self-diagnosis relating to a flash memory results in a negative consequence, a program or secret information stored in the flash memory is automatically and appropriately repaired in a secure state, realizing both security and user's convenience.

One aspect of the present invention provides an information processing apparatus comprising: a flash memory that is divided into a plurality of areas based on characteristics of information to be stored therein; a memory device that stores a set of instructions; and at least one processor that executes the set of instructions to detect a problem in data stored in each area using a different method for each area, and repair the detected problem using a different method for each area.

Another aspect of the present invention provides an information processing apparatus comprising: a first control circuit; a second control circuit that is controlled by the first control circuit and is provided with a built-in flash memory divided into a plurality of areas based on characteristics of information to be stored therein; a detection unit that detects a problem in data stored in each area of the built-in flash memory using a different method for each area; and a repair unit that repairs the problem detected by the detection unit using a different method for each area.

Still another aspect of the present invention provides a method for controlling an information processing apparatus provided with a flash memory divided into a plurality of areas based on characteristics of information to be stored therein, comprising, detecting a problem in data stored in each area, using a different method for each area; and repairing the problem detected in the detecting, using a different method for each area.

Yet still another aspect of the present invention provides a method for controlling an information processing apparatus including a first control circuit, and a second control circuit that is controlled by the first control circuit and is provided with a built-in flash memory divided into a plurality of areas based on characteristics of information to be stored therein, comprising: detecting a problem in data stored in each area of the built-in flash memory, using a different method for each area; and repairing the problem detected in the detecting, using a different method for each area.

Still yet another aspect of the present invention provides a non-transitory computer-readable storage medium storing a computer program for causing a computer to execute the method for controlling an information processing apparatus provided with a flash memory divided into a plurality of areas based on characteristics of information to be stored therein, the method comprising: detecting a problem in data stored in each area, using a different method for each area; and repairing the problem detected in the detecting, using a different method for each area.

Yet still another aspect of the present invention provides a non-transitory computer-readable storage medium storing a computer program for causing a computer to execute the method for controlling an information processing apparatus including a first control circuit, and a second control circuit that is controlled by the first control circuit and is provided with a built-in flash memory divided into a plurality of areas based on characteristics of information to be stored therein, the method comprising: detecting a problem in data stored in each area of the built-in flash memory, using a different method for each area; and repairing the problem detected in the detecting, using a different method for each area.

Further features of the present invention will be apparent from the following description of exemplary embodiments with reference to the attached drawings.

BRIEF DESCRIPTION OF THE DRAWINGS

FIGS. 4A and 4B are diagrams illustrating an example of an area configuration of a built-in flash memory and a verification method performed for each area according to one embodiment.

FIGS. 5A and 5B are diagrams illustrating examples of extended commands for the SATA bridge control unit according to one embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
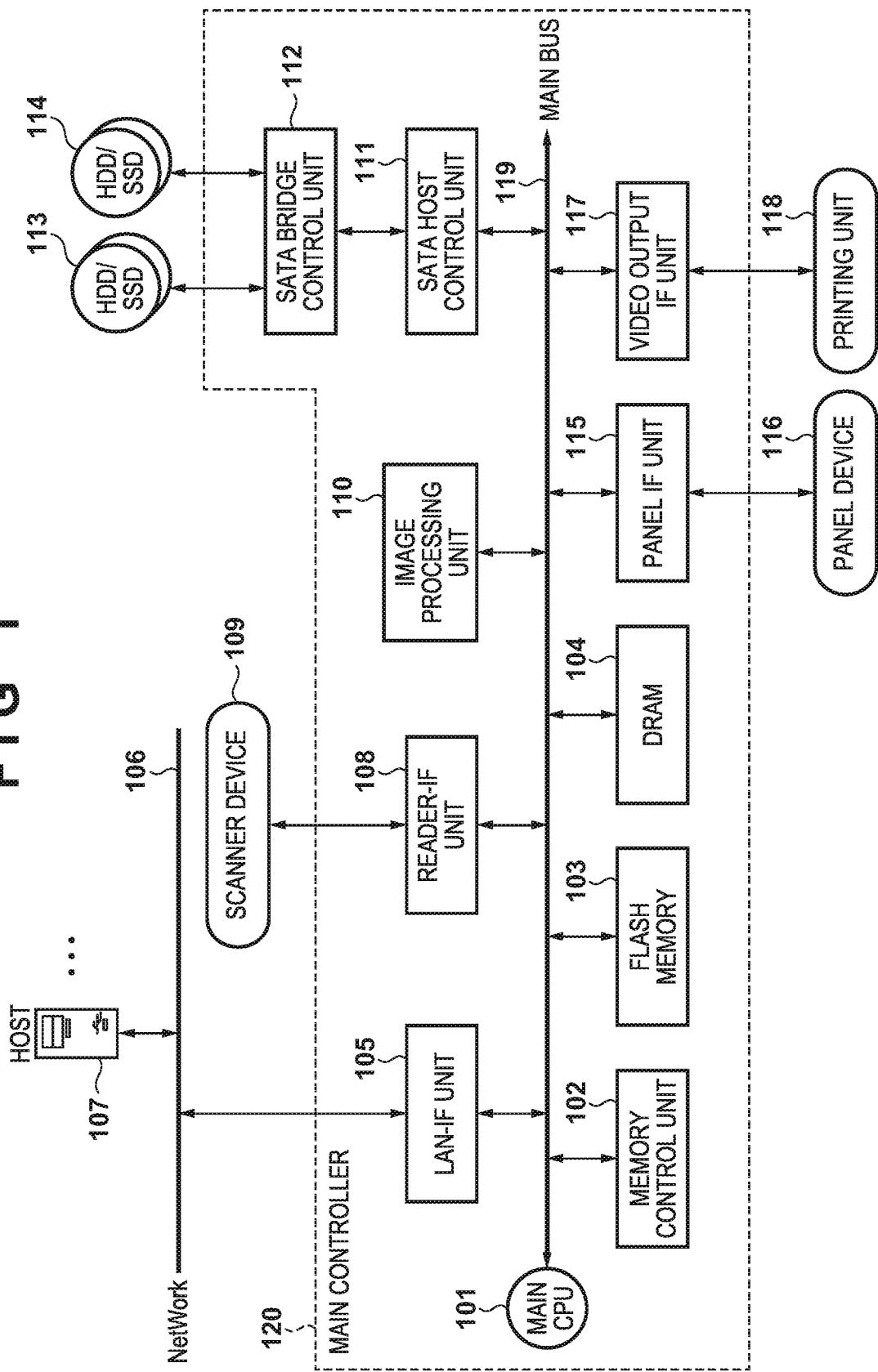
FIG. 1 is a diagram illustrating an example of a system configuration of a main controller according to one embodiment.

Configuration of Information Processing Apparatus Hereinafter, a first embodiment of the present invention will be described. First, a configuration of a printer device will be described as an example of an information processing apparatus according to the present embodiment, with reference to FIG. 1. Here, a description will be given mainly taking a system configuration of a main controller 120 included in the printer device, as an example. As shown in FIG. 1, the main controller 120 includes a main CPU 101, a memory control unit 102, a flash memory 103, a DRAM 104, a LAN-IF control unit 105, and a Reader-IF unit 108. The main controller 120 further includes an image processing unit 110, a SATAhost control unit 111, a SATA bridge control unit 112, a panel IF unit 115, and a video output IF unit 117.

The main CPU (Central Processing Unit) 101 performs system control and various types of calculation processing. The memory control unit 102 performs input/output control and DMA (Direct Memory Access) control with respect to various types of memories. The flash memory 103 is a rewritable nonvolatile memory, and stores control programs and control parameters for the entire system, and the like. The DRAM (Dynamic Random Access Memory) 104 is a volatile rewrite only memory represented by a DDR (Double-Data-Rate) memory. This is used as a program work area, a storage area for print data, a storage area for various types of tables, and the like.

Here, the relationship between the memory control unit 102 and the various memory devices is expressed in a simplified manner, and typically the memory devices are controlled independently. Furthermore, their IFs (Interfaces) are not limited to specific IFs because it is assumed that storage devices in which the memory devices are mounted have various types of IFs. For example, the IFs may also be eMMCs, SATA (Serial Advanced Technology Attachment), SPI (Serial Peripheral Interface), or the like.

The LAN-IF control unit 105 performs input/output control with respect to a local area network 106 connected to the printer device. Typically, this complies with a TCP/IP (Transmission Control Protocol/Internet Protocol). The printer device can be connected to a network-compatible device such as an external HOST computer 107 via a network cable, and can perform printing via the network. The Reader-IF control unit 108 controls communication with a scanner device 109. A copy function is realized by printing input image data scanned by the scanner device 109. The image processing unit 110 performs various types of image processing on image data acquired through the LAN-IF control unit 105 and Reader-IF control unit 108.

The SATA host control unit 111 performs data input/output control with respect to a device with an IF in compliance with the SATA standard. The SATA bridge control unit 112 is connected upstream, as a device, to the SATA host control unit 111, and has downstream a plurality of Host-IFs, via which it is connected to external storage devices, namely, an HDD/SSD 113 and an HDD/SSD 114. The SATA bridge control unit 112 has additional functions for RAID control, data encryption, and the like. In the present embodiment, a description will be given on the assumption that the SATA host control unit 111 and the SATA bridge control unit 112 are installed in the main controller 120 while serving respectively as independent ASICs (Application Specific Integrated Circuits).

The panel IF unit 115 controls communication with a panel device 116. Although not shown here, by operating a liquid crystal screen display, a button, or the like, which serves as a user interface (UI), on the panel device 116, a user can configure various settings of the printer device and check the state thereof.

The video output IF unit 117 controls communication of a command/status with a printing unit 118 and transfers print data thereto. The printing unit 118 is constituted by a printer device main body, a paper feeding system, and a paper discharge system, which are not shown here, and prints print data on a recording medium (such as paper or a sheet) mainly in accordance with information of a command from the video output IF unit 117.

A main bus 119 includes a bus controller, and is expressed as a collection of a control bus, a data bus, and a local bus between arbitrary blocks, for descriptive purposes. A PCIe (PCI Express), internal bus of the ASIC, and the like are also included as representative examples.

Connection Configuration

Figure 2:
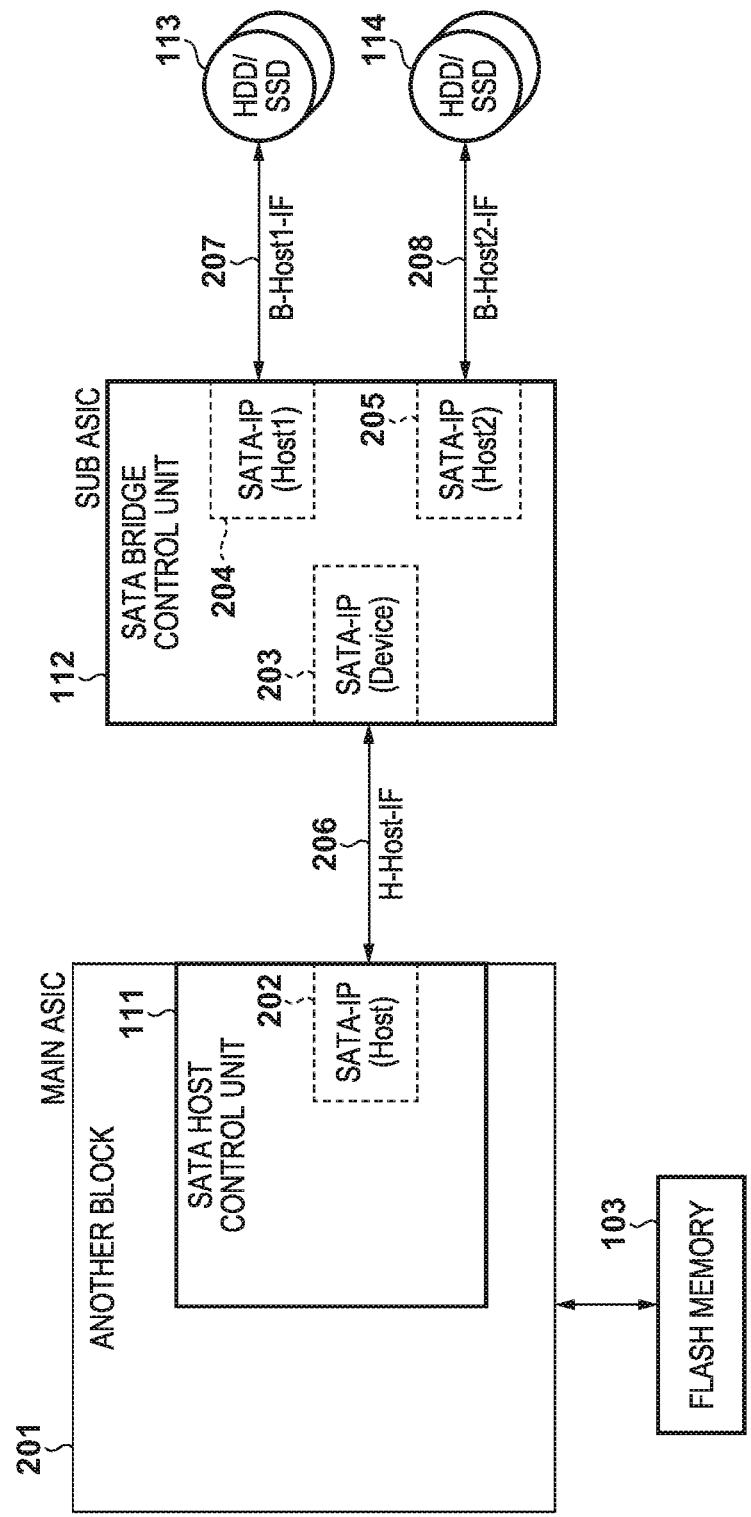
FIG. 2 is a diagram illustrating a connection example of a SATA bridge configuration according to one embodiment.

The following will describe a connection example of a SATA bridge configuration with reference to FIG. 2. The main ASIC (first control circuit) 201 is a main ASIC that controls the entire system of the main controller 120 including the SATA host control unit 111. The SATA host control unit 111 has a SATA-IP (Intellectual Property) 202 as a host IF. A sub ASIC (second control circuit) is the SATA bridge control unit 112 itself, and is implemented as an independent IC (Integrated Circuit) on the main controller 120.

The SATA bridge control unit 112 includes three SATA-IPs 203 to 205. On the upstream side of the bridge configuration, the SATA-IP (Host) 202 is connected to the SATA-IP (Device) 203 via an H-Host-IF 206. On the other hand, on the downstream side, the SATA-IP (Host1) 204 is connected to the HDD/SSD 113 via a B-Host1-IF 207, and the SATA-IP (Host2) 205 is connected to the HDD/SSD 114 via a B-Host2-IF 208. Here, the SATA-IPs 202 to 205 are each constituted by a SATA link layer and a physical layer. Furthermore, the SATA-IPs 202 to 205 issue and receive physical command and status (serving as electrical signals) in compliance with the SATA standard to and from the SATA devices connected via the SATA-IFs 206 to 208 based on the settings of the various SATA resistors.

Furthermore, the main ASIC 201 and the SATA bridge control unit 112 (sub ASIC) are connected to each other on a controller board, and the flash memory 103 is further connected to the main ASIC 201. Here, the flash memory 103 may be a device such as an eMMC, a SATA-Flash (memory device with a SATA-IF), or an SSD. According to the present embodiment, a description will be given taking an example in which an eMMC is employed as the flash memory 103. Note that, in the present embodiment, a description will be given taking an example in which there is one IF between the SATA host control unit 111 and the bridge control unit 112, and there are two IFs between the SATA bridge control unit 112 and the HDD/SSDs 113 and 114, but the connection topology of any number of the IFs may also be employed.

Internal Configuration

Figure 3:
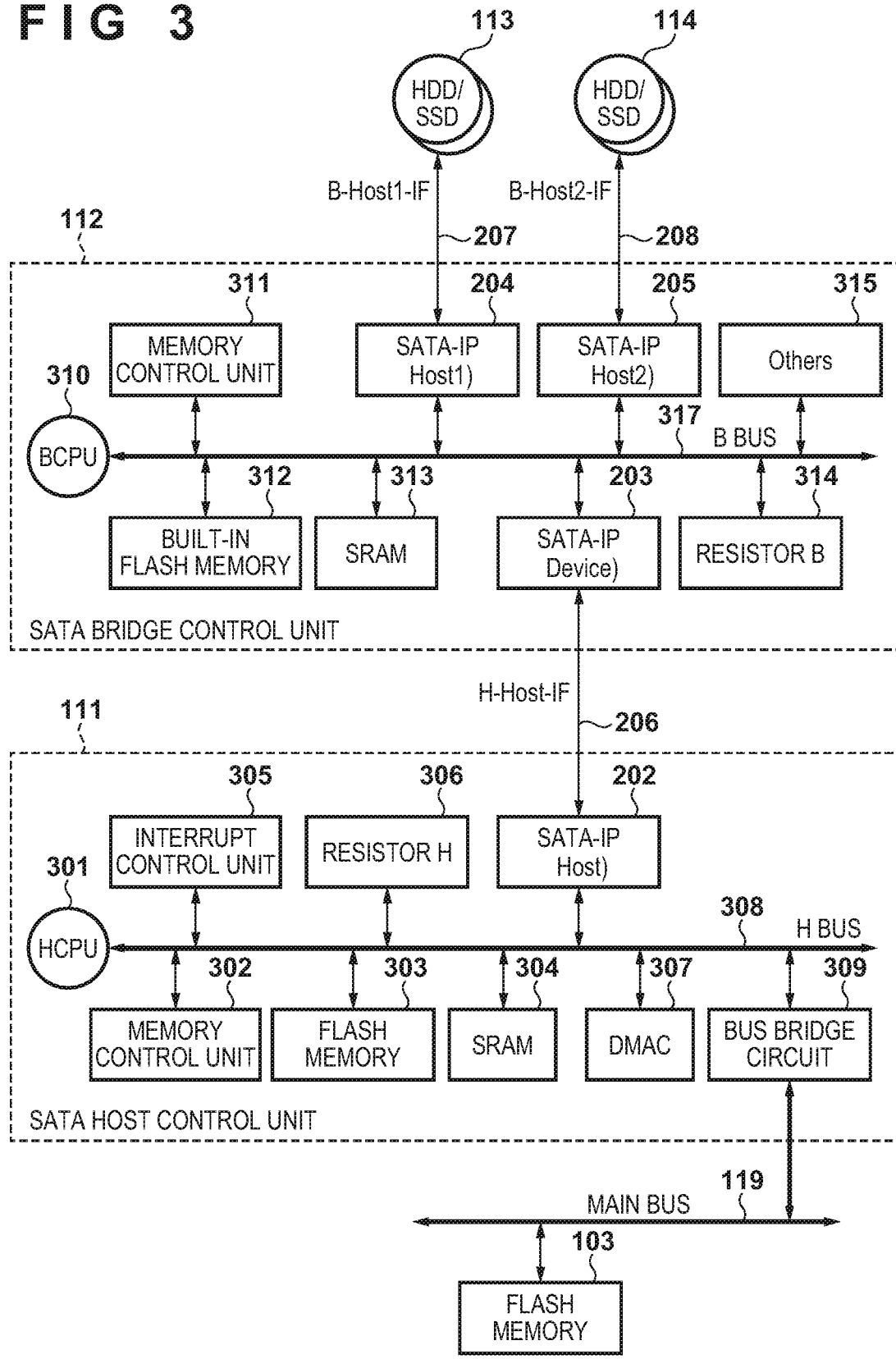
FIG. 3 is a diagram illustrating examples of internal configurations of a SATA host control unit and a bridge control unit according to one embodiment.

The following will describe examples of internal configurations of the SATA host control unit 111 and the SATA bridge control unit 112 with reference to FIG. 3. The SATA host control unit 111 includes, in addition to the configurations shown in FIG. 2, an HCPU 301, a memory control unit 302, a flash memory 303, an SRAM 304, an interrupt control unit 305, a resistor H 306, a DAMC 307, and a bus bridge circuit 309. The components are connected to each other via an H bus 308.

The HCPU 301 performs, as a SATA controller, overall control such as SATA command issuing processing, transmitted/received data forwarding processing, and status receiving processing. The memory control unit 302 performs input/output control with respect to the flash memory 303 and the SRAM (Static Random Access Memory) 304. In the flash memory 303, a boot program, a control program for the SATA controller, and the like are stored.

The SRAM 304 is used as a work area for the HCPU 301, a storage area for various types of control tables and parameters, a data buffer, and the like. Here, the SRAM 304 is expressed so that control of a one-port RAM, a two-port RAM, a FIFO (First-IN First-OUT) memory, or the like is simplified, and it is also possible that independently controlled SRAMs are provided at a plurality of positions.

The interrupt control unit 305 performs processing for inputting/outputting an interrupt signal to/from the HCPU 301, mask processing on the interrupt signal, and the like. The resistor H 306 is a resistor for temporarily storing various types of control parameters. The DMAC (Direct Memory Access Controller) 307 performs, upon the start-up, data transfer between predetermined memories, in which beginning addresses and sizes of a transfer source and a transfer destination are set in a predetermined resistor by the HCPU 301, although this is not shown here.

The H bus 308 includes a bus controller, and is expressed as a collection of a control bus, a data bus, and a local bus between arbitrary blocks, for descriptive purposes. The bus bridge circuit 309 mutually converts bus protocols for the main bus 119 and for the H bus 308. The HCPU 301 can access the flash memory (eMMC) 103 via the main bus 119.

The SATA bridge control unit 112 includes, in addition to the configurations shown in FIG. 2, a BCPU 310, a memory control unit 311, a built-in flash memory 312, an SRAM 313, a resistor B 314, and another functional block. The BCPU 310 performs, as a SATA controller, overall control such as SATA command issuing processing, transmitted/received data forwarding processing, and status receiving processing. The memory control unit 311 performs input/output control with respect to the flash memory 312 and the SRAM 313. In the built-in flash memory 312, a boot program, a control program for the SATA controller, various types of control data such as control parameters, and the like are stored. In the present embodiment, for example, the SATA bridge control unit is assumed to be a security chip, and the flash memory is built in the chip, and has stored also secret information such as original data for generating an encryption key, and an authentication ID.

The SRAM 313 is used as a work area for the BCPU 310, a storage area for various types of control tables and parameters, a data buffer, and the like. Here, the SRAM 313 is expressed so that control of a one-port RAM, a two-port RAM, a FIFO memory or the like is simplified, and it is also possible that independently controlled SRAMs are provided at a plurality of positions. The resistor B 314 is a resistor for temporarily storing various types of control parameters, and the like.

The other functional block 315 is shown as a collection of other functional blocks of the SATA bridge control unit 112, such as RAID processing and data encryption processing for example but is not relevant to the essence of the present invention, and thus a description thereof is omitted. The B bus 317 includes a bus controller, and is expressed as a collection of a control bus, a data bus, and a local bus between arbitrary blocks, for descriptive purposes. Also, as described with reference to FIG. 2, the SATA-IP (Host) 202 of the SATA host control unit 111 and the SATA-IP (Device) 203 of the SATA bridge control unit 112 are connected to each other via the H-Host-IF 206. Furthermore, the SATA-IPs (Host1/2) 204 and 205 are respectively connected to the HDD/SSD 113 and the HDD/SSD 114 via the B-Host1-IF 207 and the B-Host2-IF 208.

Built-In Flash Memory

The following will describe an example of a data area configuration of the built-in flash memory 312 with reference to FIGS. 4A and 4B. According to the present embodiment, the built-in flash memory 312 is divided into areas based on characteristics of information to be stored in the corresponding areas, for example, the nature and importance level of information, and an encryption and authentication method that realizes the appropriate security level is applied to each area (for each characteristic of the information to be stored). As shown in FIG. 4A, the built-in flash memory 312 has a data configuration that includes a loader area 401, a program area 402, a secret information area 403, and a parameter area 404.

The loader area 401 is a boot program storage area for loading some program stored in the flash memory onto the SRAM 313. The program area 402 is a storage area for programs other than the boot program, and has stored programs with a set of security-related functions such as self-test (self-diagnosis) and authentication, a set of SATA control-related functions, and other functional control-related functions (such as RAID), and the like. Furthermore, the program area 402 is configured to include two areas for update, namely, an area 1 (405) and an area 2 (406).

The secret information area 403 is a storage area for original data for generating an encryption key, and various types of security-related data. Data that is stored in the secret information area 403 is information unique to each individual chip, and loss of this data means that decryption of the existing data is no longer possible, that is, the data is important information. According to the present embodiment, also the secret information area 403 has two areas 407 and 408 for update, as with the program area 402.

The parameter area 404 is an area in which state information and the like are stored, the state information being used to decide, when the system is shut down, the state to be taken for the next start of the system. For example, assuming that mirroring processing has been executed by two HDDs, information indicating a state position, and information indicating which drive was a master, and the like is stored, and thus it is possible to start control from the previous state when the system is started next time. The parameter area 404 has an internal configuration of divided small areas (the drawing shows an example in which N equally divided areas are included) as shown with the reference numeral 409, which are used sequentially as a ring buffer.

According to the present embodiment, for the security level of each of the divided areas, a different encryption and authentication method is applied based on the characteristic of the information stored therein. Furthermore, an internal self-test method and an update (repair) verification method that are appropriate for each area are applied based on the characteristic and type of information stored in each of the divided areas. FIG. 4B shows a table 410 indicating a chip inside self-test and an update (repair) verification method that are association with each area. The genuineness of a program stored in the program area 401 is verified by calculating the hash value of the program, and decrypting an appended digital signature, which is encrypted using a secret key of the vendor, using a public key of the verifier. The encryption of a secret key may use, for example, an RSA encryption, which is a public key cryptosystem using difficulty of factorization into prime factors.

Secret information stored in the secret information area 403 is verified as to whether or not there is a failure, in an internal self-test conducted during a normal operation using an EDC (error-detecting code). On the other hand, at the time of update (repair), the hash value of the secret information is calculated, and the genuineness is verified with a message authentication code encoded using a common key of the vendor. The message authentication code may be, for example, an HMAC, which is of a type in which the hash value of a target file is encoded using a common key and a falsification is detected.

In the parameter area 404, when a parameter is registered into each of the N equally divided sub-areas, a beginning flag, which indicates the start of the recording, is written into a predetermined head area and an ending flag, which indicates the completion of the recording, is written into a predetermined tail area, and thereby it is verified whether or not the parameter has been normally written into the target sub-area. For example, a flash memory, when initialized, has a default value of "all Fh", and it is preferable to write, when the beginning flag and the ending flag have normally been written, "all 0h" into the corresponding areas of the flags (of, for example, 4 bytes in size). By reading these flags at the next start, it is possible to determine whether or not the previous writing processing has been normally executed. Furthermore, by setting the size of each flag to multi-bits, instead of one bit, it is possible to suppress the likelihood of erroneous determination at the next start to a low level (almost zero) even if an unanticipated situation such as instantaneous interruption or electrostatic noise occurs during the writing processing.

According to the present embodiment, thus, the built-in flash memory 312 is divided into areas based on characteristics of information to be stored in the corresponding area, and an appropriate method such as a self-test (self-diagnosis), repair, encryption, and authentication is applied for each area. With this, programs and secret information can be robust against sniffing or falsification, and even if sector faults, data loss, or the like that may be caused by instantaneous interruption or electrostatic noise, it is possible to appropriately repair the information while suppressing the chip cost.

Command

The following will describe examples of sets of commands for controlling the SATA bridge control unit 112 from the upstream SATA host control unit 111 with reference to FIGS. 5A and 5B. Each of the commands is a command other than a SATA standard command using a vendor-unique command in the SATA standard. Hereinafter, these commands are referred to as "extended commands".

The SATA bridge control unit 112 is overall controlled in an in-band manner through the SATA-IF. The set of extended commands shown in a table 501 in FIG. 5A are extended commands that are used when the SATA bridge control unit 112 is initially installed and are used to output the secret information area 403 unique to each sub ASIC to the outside of the chip. The set of extended commands shown in a table 511 in FIG. 5B include extended commands for use in self-repair of the secret information area 403 and extended commands for use in automatic repair of the program area 402, when the self-test inside the sub ASIC results in a negative consequence and the state has transitioned to an error state. The details of processing for the extended command in the tables 501 and 511 will be described with reference to other drawings, and thus are omitted here.

State Transition

Figure 6:
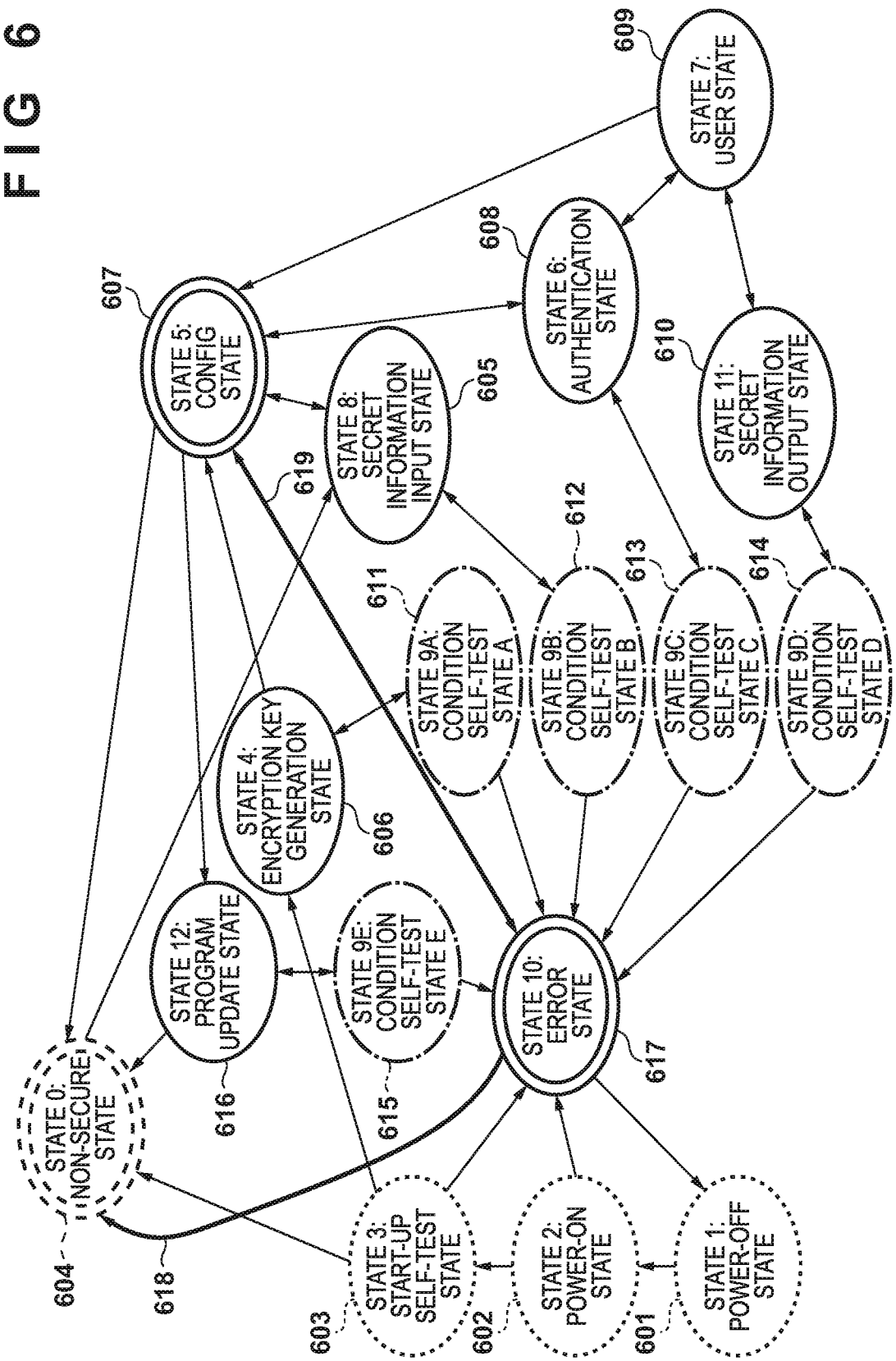
FIG. 6 is a diagram illustrating security-related FSM inside the SATA bridge control unit according to one embodiment.

The following will describe an FSM (Finite State Machine) within the SATA bridge control unit 112 (sub ASIC) with reference to FIG. 6. The FSM are hereinafter referred to as "SFSM" in the sense that it relates to security.

Prior to initial installation, the SFSM of the SATA bridge control unit 112 transitions, upon power being turned on, from a state 1: Power-Off state 601 to a state 2: Power-On state 602. In this context, "initial installation" refers to processing for installing information relating to authentication information or encryption information into the SATA bridge control unit 112 at the first start-up. If no error occurs during the transition to the state 2, the SFSM will transition to a state 3: Start-up self-test state 603. If no problem occurs during the start-up self-test, the SFSM will transition to a state 0: Non-Secure state 604. At this point in time, the SFSM is in the non-secure state based on the premise that the initial installation has not yet been completed, and data stored in the HDD cannot be encrypted in this state.

Then, the SFSM transitions from the state 0: Non-Secure state 604 to a state 8: Secret Information Input state 605, where secret information such as an authentication ID for use in various types of authentication processing is installed, and secret information that is unique to each individual chip and serves as original data for generating an encryption key is generated. If the generation of these pieces of information is complete, the SFSM transitions to a state 5: Config state 607. At this point in time, the mode is switched to the secure state from the non-secure state.

After the completion of the initial installation, when the system is started again in the state 5, the SFSM again transitions from the state 1: Power-Off state 601 to the state 3: Start-up self-test state 603 via the state 2: Power-On state 602. If the result of the start-up self-test is successful, the SFSM transitions to state 4: Encryption Key Generation state 606, and, after the generation of an encryption key has been executed based on the secret information area 403, the SFSM transitions to the state 5: Config state 607.

Then, the SFSM transitions from the state 5 to a state 6: Authentication state 608, where authentication of the SATA host control unit 111 (main ASIC) is executed by the SATA bridge control unit 112 (sub ASIC), and conversely, authentication of the sub ASIC is executed by the main ASIC. When the mutual authentication processes have been successful, the SFSM can transition to a state 7: User state 609. At this time of the state 7, data can be written into and read out from the HDD (or SSD), data to be stored in the HDD (or SSD) is encrypted, and data to be read out is decrypted. Furthermore, only the person authorized to reach the state 7 transitions to a state 11: Secret Information Output state 610 via the state 6: Authentication state 608, so that it is possible to output the secret information area 403.

Furthermore, as a result of the state 5: Config state 607 transitioning to a state 12: Program Update state 616 via the state 6: Authentication state, it is possible to execute program update processing. Here, the state 4, the state 8, the state 6, the state 11, and the state 12 respectively transition to the following states 9A to 9E: Condition Self-Tests A to E, where genuineness verification of the secret information area 403 for use in the authentication processing and functional verification of a random number generator and a hash function are executed. The state 9A indicates a Condition Self-Test state A611, the state 9B indicates a Condition Self-Test state B612, the state 9C indicates a Condition Self-Test state C613, the state 9D indicates a Condition Self-Test state D614, and the state 9E indicates a Condition Self-Test state E615. If the verification in the condition self-tests A to E (611 to 615) has failed, the SFSM falls to a state 10: Error state 617.

Note here that a case is assumed where, for example, FIPS authentication (Federal Information Processing Standardization: a cryptographic module test) is acquired as security authentication. In this case, if the SFSM has once transitioned to the state 10: Error state 617, an authentication requirement of inhibiting access to existing data stored in the HDD (or SSD) will be added unless the problem has been solved (or repaired, if a failure is handled).

Procedure of Processing of SATA Host Control Unit

Figure 7:
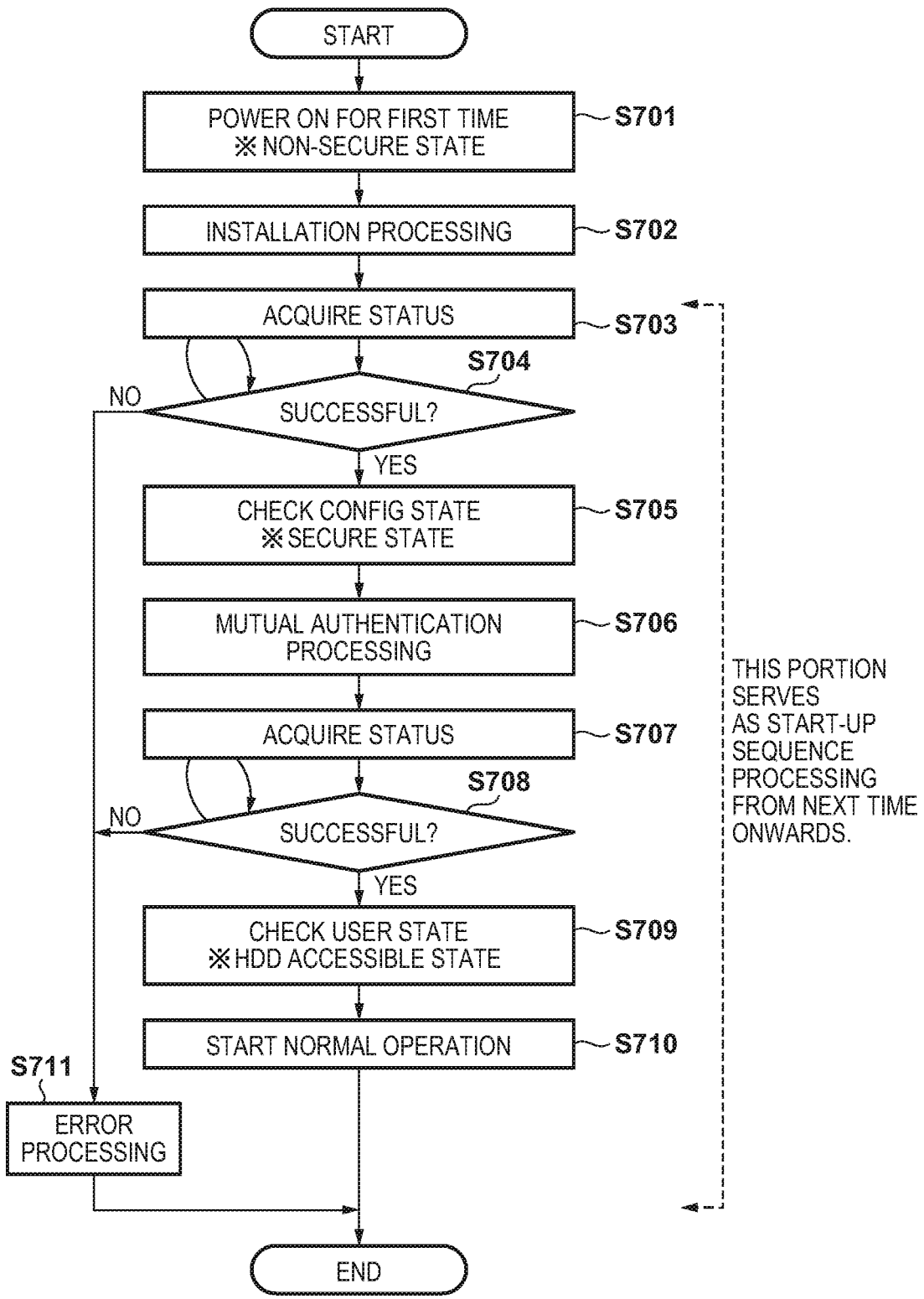
FIG. 7 is a diagram illustrating installation and start-up sequence processing of the SATA host control unit according to one embodiment.

The following will describe a procedure of processing of the SATA host control unit 111 when it causes the SATA bridge control unit 112 to perform installation processing and start-up processing at the first start-up with reference to FIG. 7.

In step S701, power is turned on for the first time. Here, the SATA bridge control unit 112 (sub ASIC) mounted on each controller board is yet in a non-secure state when power is turned on for the first time. In step S702, the HCPU 301 of the SATA host control unit 111 issues an Install-Secret-Info command 502 in the table 501 in FIG. 5A to the SATA bridge control unit 112 via the H-Host-IF 206 so that installation processing starts.

In this installation processing, the secret information area 403 is generated that serves as ID information for various types of authentication between the SATA host control unit 111 and the SATA bridge control unit 112, and original data for generating an encryption key unique to the individual sub ASIC. Although not shown here, the secret information area 403 generates, as secret information, a seed value given to a pseudo random number generator from a true random number generator included in the other functional block 315. Accordingly, if part of the secret information is lost, it will not be possible to generate the same secret information even on the same sub ASIC.

Then, in step S703, the HCPU 301 issues a Get-Status command 503 in the table 501, and acquires the internal status of the SATA bridge control unit 112. In step S704, the HCPU 301 determines, based on the internal status acquired in step S703, whether or not the installation processing in step S702 has been successful. Here, an arrow in the shape of a loop between steps S703 and S704 indicates that polling processing in which the Get-Status command 503 is issued on a regular basis is executed. According to the present embodiment, the polling method using the Get-Status command 503 is described as the method for acquiring the internal status of the SATA bridge control unit (sub ASIC) 112, but this does not mean that the status acquiring method is limited to the polling method. Another method may also be used in which an interrupt signal is provided as a sideband signal, besides the SATA-IF, and an interrupt is issued to the HCPU 301 or the main CPU 101 from the BCPU 310 at a timing serving as a check point.

If the result of the determination in step S704 was successful (YES), the procedure moves to step S705, where the HCPU 301 checks the internal state of the SATA bridge control unit 112, and transitions to the state 5: Config state 607 shown in FIG. 6, shifting to the secure state. Then, in step S706, the HCPU 301 issues a series of mutual authentication commands to the SATA bridge control unit 112. Specifically, the extended command Nos. C0h to C4h (504 to 508) in the table 501 are issued, and mutual authentication between the SATA host control unit 111 and the SATA bridge control unit 112 with respect to each other is executed using a challenge-response method, which is a common authentication method. Note that, in the SATA standard, unidirectional communication is basically performed from the host, and thus the commands need to be issued by the HCPU 301.

After the commands for mutual authentication have been issued, the HCPU 301 sequentially acquires, in step S707, the status of the SATA bridge control unit 112 during the polling processing with the Get-Status command 503, and determines, in step S708, whether or not the mutual authentication has been successful. Similar to steps S703 and S704, an arrow in the shape of a loop between steps S707 and S708 indicates that polling processing in which the Get-Status command 503 is issued on a regular basis is executed.

If the result of the determination in step S708 was successful (YES), the procedure moves to step S709, where the HCPU 301 acknowledges that the internal state of the SATA bridge control unit 112 is the User state. In other words, this means that the state has transitioned to the state 7: User state 609 in FIG. 6. As described above, only in the state 7: User state 609, it is possible to access (write/read) data in the HDD (or SSD).

Then, in step S710, the HCPU 301 notifies the main CPU 101 of the fact that the start-up processing of the SATA system is complete and it is accessible, and starts a normal operation. Here, if the result of the determination in step S704 or S708 was unsuccessful (NO), the procedure moves to step S711. In step S711, the HCPU 301 executes error processing. As content of the error processing, whether or not self-repair is possible is performed is determined, and efforts are taken to return to the normal operation as long as possible, but details thereof will be described with reference to another drawing, and thus only outline will be described here. Furthermore, a description of the following start-up sequence on the HCPU 301 side in the present embodiment will be omitted because the start-up sequence corresponds to the procedure of the flow from steps S703 to S711.

Procedure of Processing of SATA Bridge Control Unit

Figure 8:
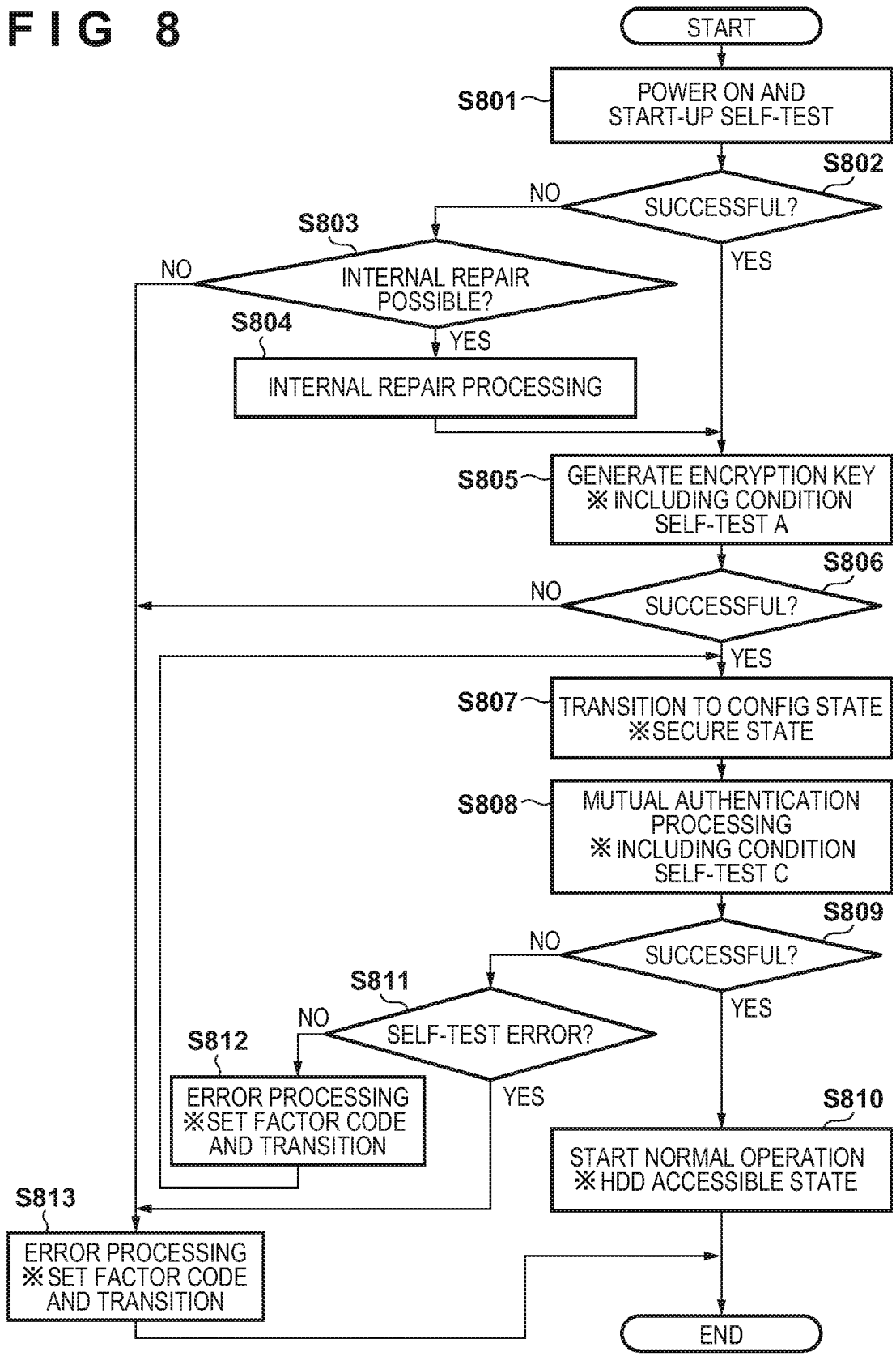
FIG. 8 is a diagram illustrating a start-up sequence of the SATA bridge control unit according to one embodiment.

The following will describe a procedure of processing of the SATA bridge control unit 112 that is performed from the second start-up onwards with reference to FIG. 8. Note however that it is premised that the initial installation processing is already complete, and the start-up sequence is performed in a state in which secure operation is possible.

In step S801, when the SATA bridge control unit 112 (sub ASIC) is turned on and boot processing of the BCPU 310 itself is complete, the BCPU 310 transitions to the state 3: Start-up self-test state 603 in FIG. 6 and executes verification. The content of the verification here is such that in the parameter area 404, the previous states of the beginning/ending flags of writing into the flash memory are verified. Also, as verification of the digital signature in the area 1 (405) of the program area 402 and encryption functional verification, a functional test (known answer test) of an encryption engine (for example, AES: Advanced Encryption Standard), a random number generator, and a hash function is executed.

If the result of the determination in step S802 was successful (YES), the procedure moves to step S805, where the BCPU 310 executes encryption key generating processing. Furthermore, as described with reference to the state 4: Encryption Key Generation state 606 in FIG. 6, the BCPU 310 executes the condition self-test A611. Here, "condition self-test" is, if encryption-related functions are used, to verify whether or not these functions are normal immediately before the use, and EDC verification of the area 1 (407) of the secret information area 403, and a functional test (known answer test) of a random number generator and a hash function are executed.

If the determination in step S806 indicates that an encryption key was successfully generated (YES), the procedure moves to step S807, where the BCPU 310 transitions to the Config state, that is, the state in which it can accept an authentication request from the SATA host control unit 111. The SATA bridge control unit 112 internally transitions to the state 5: Config state 607 described with reference to FIG. 6, and the mode is switched from the non-secure state to the secure state. Then, in step S808, the BCPU 310 executes mutual authentication processing upon receiving the mutual authentication-related commands (the extended command Nos. C0h to C4h (504 to 508) in the table 501) from the HCPU 301. As described with reference to FIG. 7, challenge-response authentication processing is employed but details thereof are omitted because they are not relevant to the essence the present invention. Also, during the process thereof, the state transitions to the state 6: Authentication state 608 in FIG. 6, and the condition self-test C613 is executed.

In step S809, the BCPU 310 determines whether or not the mutual authentication processing was successful, and if it was successful, the procedure moves to step S810. In step S810, the BCPU 310 starts a normal operation and this flowchart is ended. Specifically, the BCPU 310 transitions to the state 7: User state 609 in FIG. 6 and starts accepting writing/reading processing with respect to the HDD (or SSD).

On the other hand, if, in step S802, it is determined that the start-up self-test was not successful (NO), the procedure moves to step S803, where the BCPU 310 determines whether or not internal repair is possible, and the result of the determination indicates that the internal repair is possible (YES), the procedure moves to step S804. In step S804, the BCPU 310 executes internal auto repair processing, and the procedure moves to step S805. Note that content of step S804 will be described in detail later with reference to FIG. 10, and thus a description thereof is omitted. On the other hand, if, in step S803, it is determined that the internal repair is not possible (NO), the procedure moves to step S813. If, in step S806, generation of an encryption key has failed (NO), it means that verification of the condition self-test A611 has failed, and the procedure moves to step S813. Furthermore, if, in step S809, the mutual authentication had failed (NO), the procedure moves to step S811. Moreover, in step S811, the BCPU 310 determines whether or not the failure was caused by a (condition) self-test error. If it is determined, in step S811, that it was not caused by a self-test error (NO), the procedure moves to step S812, where the BCPU 310 executes error processing and returns the procedure to step S807. As the error processing, an occurrence factor code is set and the state transitions to the Config state. Then, the error occurrence factor code is used for determination performed when a status is acquired with the Get-Status command 503, and the determination as to whether to continue retrying or to give up due to a time out from the determination result depends on the processing of the upstream HCPU 301. If, in step S811, it is determined that it was caused by a self-test error (YES), the procedure moves to step S813.

In step S813, the BCPU 310 executes error processing as a result of the self-test error. As the error processing, an occurrence factor code is set, and the state transitions to the state 10: Error state 617 described with reference to FIG. 6. Then, the determination as to whether the HCPU 301 executes auto repair gives up due to a time out from the status acquisition with the Get-Status command 503 depends on the processing of the upstream HCPU 301.

Backup Processing

Figure 9:
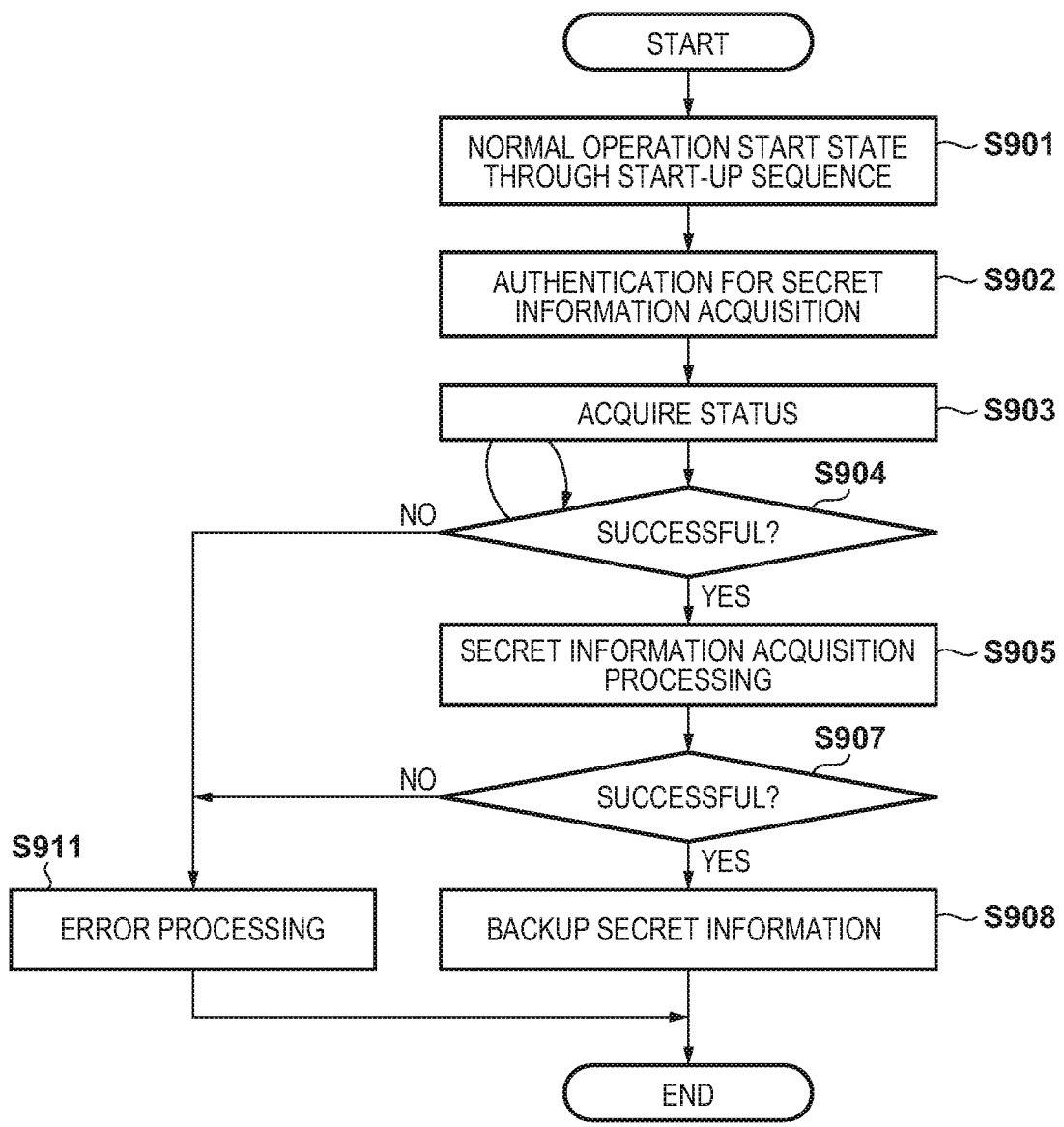
FIG. 9 is a diagram illustrating a flow of secret information backup processing according to one embodiment.

The following will describe a procedure of processing for backing up information stored in the secret information area 403 of the built-in flash memory 312 of the SATA host control unit 111 with reference to FIG. 9. It is assumed that the HCPU 301 has shifted to a normal operation start state through the start-up sequence from step S703 to step S711 described with reference to FIG. 7, and has started normally up to here (step S901).

In step S902, the HCPU 301 executes authentication processing for secret information acquisition. Specifically, the HCPU 301 sends, to the SATA bridge control unit 112, the Request-CHA-C3 command 508 and the Send-RES-C3 command 509 shown in FIG. 5A, and executes authentication processing using a challenge-response method.

In step S903, the HCPU 301 acquires, using the Get-Status command 503, a status as a result of the secret information acquisition authentication, and determines, in step S904, whether or not the authentication was successful. Here, an arrow in the shape of a loop between steps S903 and S904 indicates that polling processing in which the Get-Status command 503 is issued on a regular basis is executed. If the result of the determination in step S904 indicates that the authentication was successful (YES), the procedure moves to step S905, where the HCPU 301 issues an Export-CSP command 510 to give a request for a secret information, and waits for its status.

Then, if, in step S907, the HCPU 301 has acquired the status from the BCPU 310 indicating a successful acquisition (YES), the procedure moves to step S908. In step S908, the HCPU 301 calculates the hash value of the secret information acquired from the SATA bridge control unit 112, and compares the acquired message authentication code with a decrypted value, to check the genuineness. Here, if a message authentication code is used, it is assumed that a common key was shared in advance at the time of the installation processing. Furthermore, the HCPU 301 executes processing for backing up the acquired secret information at a predetermined position. In the present embodiment, the acquired secret information is assumed to be stored in the flash memory (eMMC) 103, but the backup destination is not particularly limited.

On the other hand, if, in step S904, the authentication for secret information acquisition has failed (NO), the procedure moves to step S911. In step S911, the HCPU 301 executes error processing. As content of the error processing, retry processing is conceivable but is not relevant to the essence of the present invention, and thus a description thereof is omitted. Here, the acquired secret information includes secret information main body data, and its message authentication code (HMAC). In the present embodiment, a description will be given on the assumption that the secret information verification method is based on a message authentication code, but the present invention is not limited to this and another method (using only a hash value, or a digital signature or the like) may also be used. Typically, a reliable (high security level) method takes some amount of time for verification processing and updating processing. In other words, in these types of processing, the reliability and necessary time for processing are in a relationship of trade off, and depend on the security level to be appended to information to be stored in each area, the information being desired to be added to a product to be applied or storage information to be applied.

Self-Repair Processing (Parameter Area)

Figure 10:
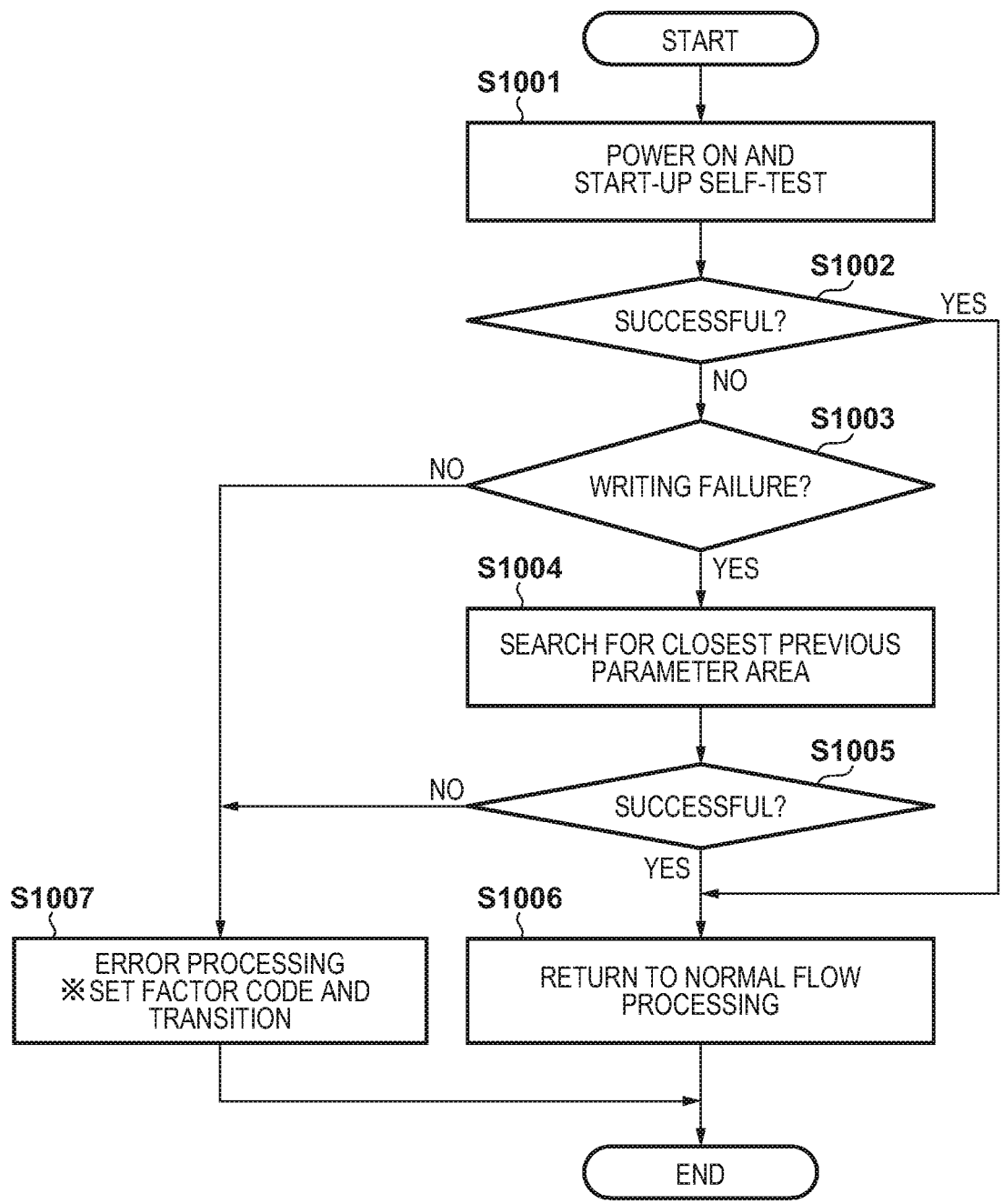
FIG. 10 is a diagram illustrating a flow of self-repair processing when a parameter writing failure has occurred according to one embodiment.

The following will describe a flow of self-repair processing performed when a failure in writing into the parameter area 404 of the built-in flash memory 312 is detected with reference to FIG. 10. This corresponds to processing on the BCPU 310 side in step S804 described with reference to FIG. 8.

In step S1001, the BCPU 310 executes a start-up self-test when power is turned on. In step S1002, the BCPU 310 determines whether or not the result of the execution of the self-test was successful (YES), and if it was successful, the procedure moves to step S1006. In step S1006, the BCPU 310 advances the procedure to the normal operation state through the start-up sequence (transition to step S805) described with reference to FIG. 8, and waits for an access from the upstream HCPU 301.

On the other hand, if, in step S1002, it is determined that the self-test has failed (NO), the procedure moves to step S1003, where the BCPU 310 determines whether or not the failure factor is a failure in writing into the flash memory. Specifically, the writing beginning and ending flags in the parameter area 404 described with reference to FIG. 4B are checked, and if either one or both of the beginning and ending flags of "Current" (target area) have detected in an unwritten state, it is determined that it is a writing failure, and the procedure moves to step S1004.

In step S1004, the BCPU 310 checks the ring buffer 409 of the parameter area 404 in order from the area closest to the "Current", and searches for the previous parameter area in which the beginning and ending flags are in the writing complete state (both flags have "all Fh"). Then, in step S1005, the BCPU 310 determines whether or not an alternative parameter area was successfully found (YES), and if it was successfully found, the procedure moves to step S1006, where information in these parameter areas are used to start.

On the other hand, if the determination in step S1003 indicates that the failure factor of the start-up self-test is not a writing failure (NO), or if searching for a previous parameter area in step S1005 has failed (NO), the procedure moves to step S1007. In step S1007, the BCPU 310 executes error processing. Here, specifically, an error factor is set and the state transitions to the error state. In the actual product operation, the error processing relates to the problem how to handle an error using the content of the status acquired by the upstream HCPU 301 with the Get-Status command 503 and is not relevant to the essence of the present invention, and thus a detailed description will be omitted.

Self-Repair Processing (Secret Information Area)

Figure 11:
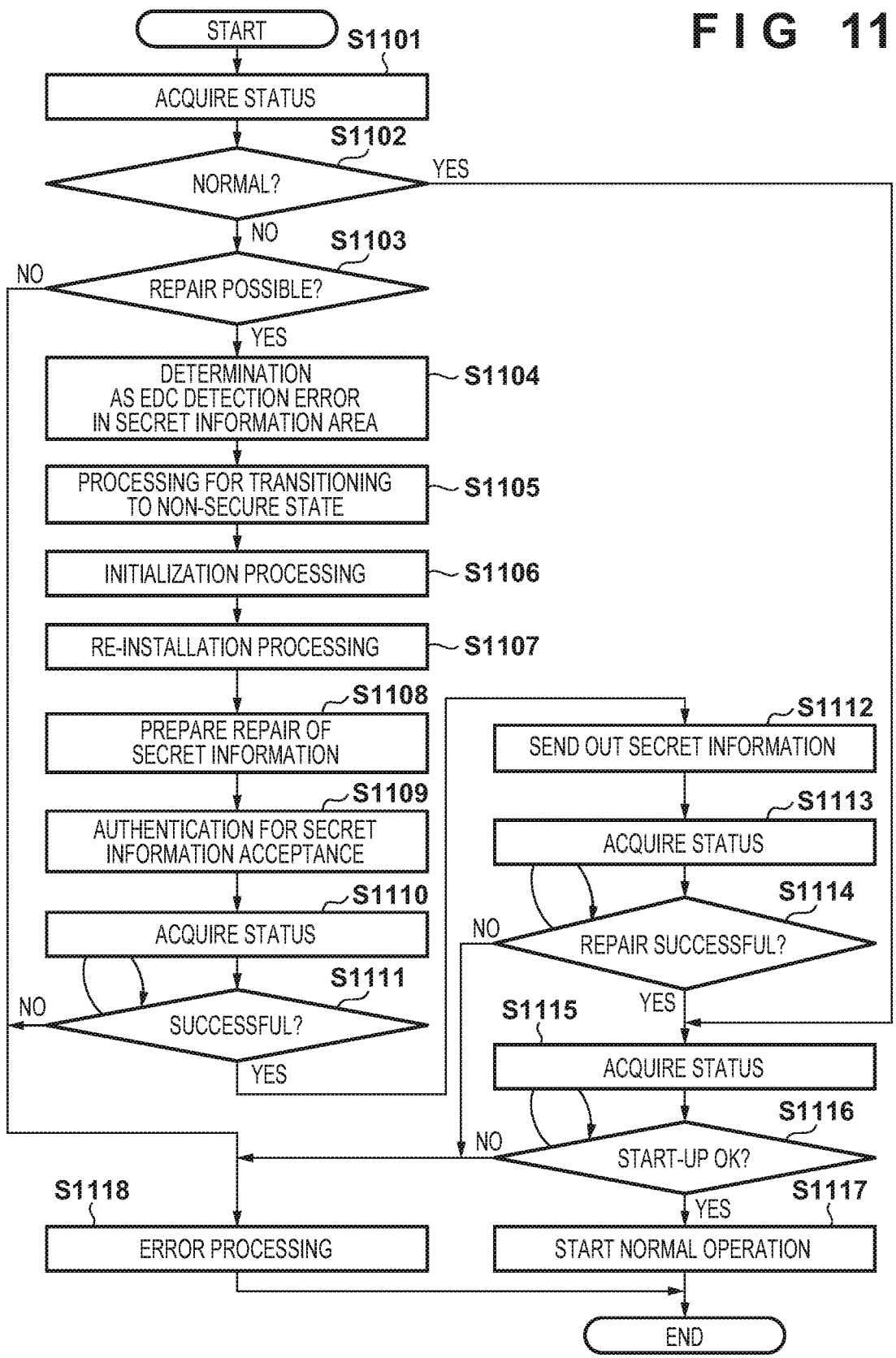
FIG. 11 is a diagram illustrating a flow of self-repair processing when a secret information failure has been detected according to one embodiment.

The following will describe a flow of self-repair performed when a secret information failure has been detected with reference to FIG. 11.

In step S1101, which is an arbitrary timing, the HCPU 301 acquires the internal status of the sub ASIC and determines in step S1102 whether or not it is normal. If, in step S1102, it is determined that there is an abnormality (NO), the procedure moves to step S1103, where the HCPU 301 determines whether or not repair is possible. If, in step S1103, it is determined that repair is possible (YES), the procedure moves to step S1104. In step S1104, the HCPU 301 determines it as an EDC detection error of the secret information area in the condition self-test X (X: A to E (611 to 616)) based on the error factor code, and starts preparation of a repair operation. First, in step S1105, the HCPU 301 issues a Change-To-NonSecure command 512 in FIG. 5B. Accordingly, the internal state of the SATA bridge control unit (sub ASIC) 112 is temporarily shifted from the state 10: Error state 617 to the state 0: Non-Secure state 604.

Then, in step S1106, the HCPU 301 issues an Erase-Secret-Info command 513 in FIG. 5B, so that the authentication ID and the secret information stored in the secret information area 403 installed in the SATA bridge control unit (sub ASIC) 112 are discarded. Then, in step S1107, the HCPU 301 executes re-installation processing. The installation processing is the same processing as the installation processing of step S702 in FIG. 7 and thus a description thereof is omitted.

Then, in step S1108, the HCPU 301 prepares secret information to be updated in the SATA bridge control unit (sub ASIC) 112. Specifically, a secret information+message authentication code stored in the flash memory (eMMC) 103 is read out, and is stored in the DRAM 104, which is a main memory. Then, in step S1109, the HCPU 301 issues a Request-CHA-C4 command 514 and a Send-RES-C4 command 515 in FIG. 5B, and performs authentication for secret information acquisition using a challenge-response authentication method. In this case, this means that the BCPU 310 authenticates the HCPU 301. Then, in step S1110, the HCPU 301 acquires the status, and determines, in step S1111, whether or not its result was successful, and if it was successful (YES), the procedure moves to step S1112.

In step S1112, the HCPU 301 issues an Import-CSP command 516 in FIG. 5B, and gives the secret information+message authentication code prepared as associated data to the SATA bridge control unit (sub ASIC) 112. Processing on the BCPU 310 side that has received the code will be described later with reference to FIG. 12. Then, in step S1113, the HCPU 301 acquires the status, and if the result of checking in step S1114 indicates that the repair was successful (YES), the procedure moves to step S1115. In step S1115, the HCPU 301 checks the status, and if the result of determination in step S1116 indicates that start-up is possible (YES), a normal operation is started from step S1117.

On the other hand, if the result of the status check in step S1102 indicates that the status is normal (YES), the procedure moves to step S1115. The subsequent procedure is the same as the described content and thus a description thereof is omitted. Furthermore, after the result of the status check in step S1102 indicated that the status is abnormal (NO), if the determination in step S1103 indicates that repair is impossible (NO), and if the authentication for secret information acceptance in step S1111 has failed (NO), the procedure moves to step S1118. Furthermore, if the repair processing in step S1114 has failed (NO), and if the result of status check in step S1116 indicates that start-up is not possible (NO), the procedure moves to step S1118. In step S1118, the HCPU 301 executes error processing, and this flowchart is ended. The error processing is not relevant to the essence of the present invention, and thus a description thereof is omitted.

Self-Repair Processing (Program Area)

A flow of the update processing of the program area 402 differs from the self-repair processing of the secret information area 403 described with reference to FIG. 11 only in used extended commands, and basically has the same processing flow and thus is not shown. Note however that, in case of updating a program, it is assumed that backup data thereof is stored in the flash memory (eMMC) 103 with a digital signature appended thereto.

Update Processing (Secret Information Area and Program Area)

Figure 12:
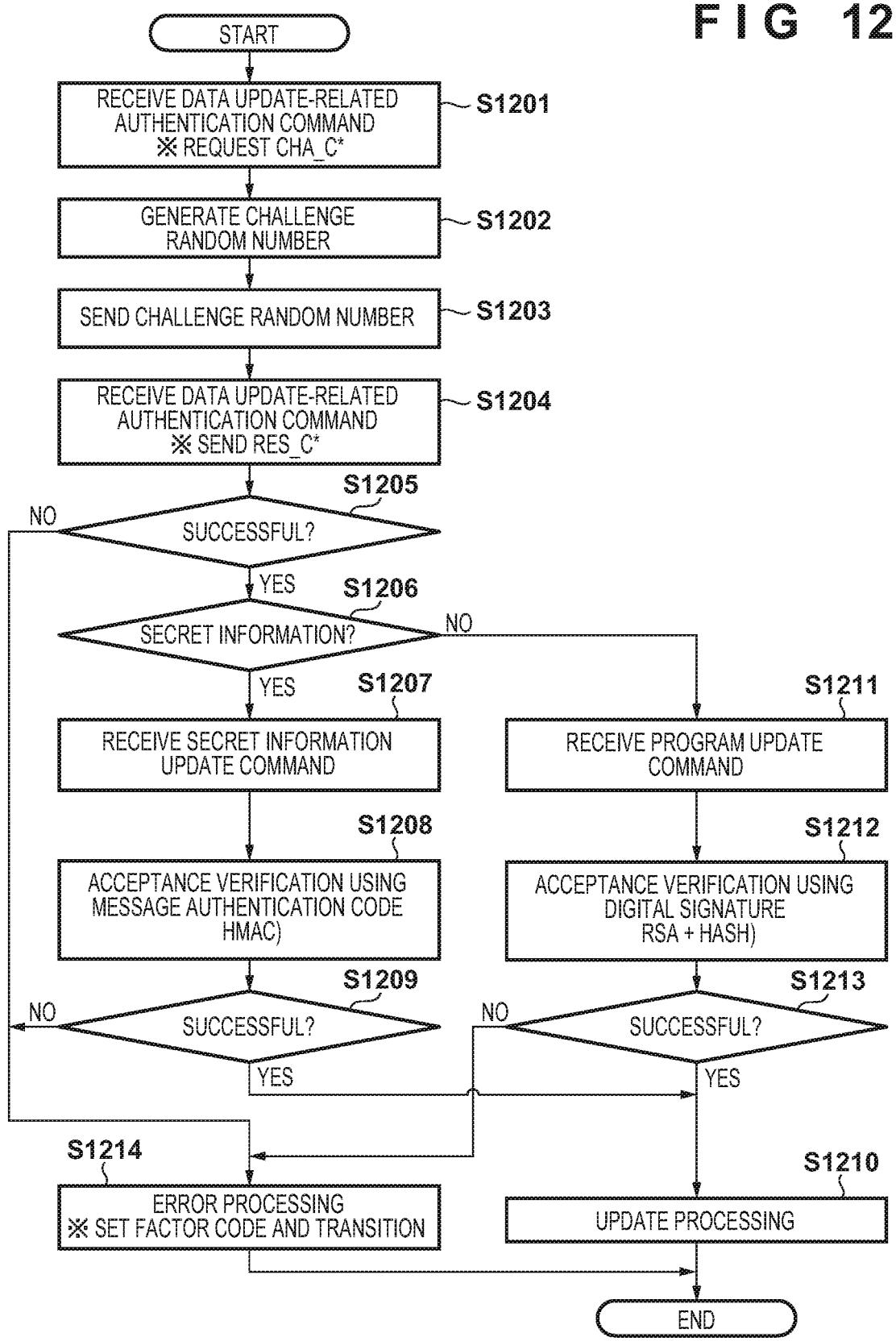
FIG. 12 is a diagram illustrating a flow of secret information and program update processing according to one embodiment.

The following will describe a flow of processing for updating information stored in the secret information area 403 and the program area 402 with reference to FIG. 12.

In step S1201, the BCPU 310 receives one of data update (secret information and program)-related authentication commands. Specifically, the commands are Request-CHA-C* commands of a challenge-response authentication method for requesting challenge random numbers. They correspond to the Request-CHA-C4 command 514 and the Request-CHA-C6 command 517 in FIG. 5B. Furthermore, extended commands serving as responses to these challenge random numbers are the Send-RES-C4 command 515 and the Send-RES-C6 command 518.

Then, in step S1202, the BCPU 310 generates a challenge random number, and sends, in step S1203, the challenge random number generated as a status response of the Request-CHA-C* command. Then, in step S1204, the BCPU 310 receives a Send-RES-C* command serving as a response from the HCPU 301, and verifies, in step S1205, the response value to determine whether or not authentication was successful. If the result of the determination in step S1205 indicates that the authentication was successful (YES), the procedure moves to step S1206, where it is determined whether or not it is update of the secret information.

If the result of the determination in step S1206 indicates that it is update of the secret information, the procedure moves to step S1207. In step S1207, the BCPU 310 waits for receiving a secret information update command. Then, upon receiving the Import-CSP command 516 in FIG. 5B, which is the secret information update command, the BCPU 310 executes, in step S1208, acceptance verification using the message authentication code (HMAC). Here, the received data of the secret information is stored in the area 2 (408) of the secret information area 403. If, in step S1209, the acceptance verification was successful (YES), the procedure moves to step S1210.

On the other hand, if, in step S1206, it is determined that it is update of the program (NO), the BCPU 310 waits, in step S1211, for receiving a program update command, similar to the case of update of the secret information. Then, upon receiving the Update-Program command 519 in FIG. 5B, which is a program update command, the BCPU 310 executes, in step S1212, acceptance verification using a digital signature (RSA+Hash). Here, the received data of the update program is stored in the area 2 (408) of the program area 402. If, in step S1213, the acceptance verification was successful (YES), the procedure moves to step S1210.

In step S1210, the BCPU 310 executes update processing. When the secret information and the program are used from the next time onwards, the areas 2 are used. Here, if the update permission authentication in step S1205 has failed (NO), if the acceptance verification for secret information update in step S1209 has failed (NO), or if the acceptance verification for program update in step S1213 has failed (NO), the procedure moves to step S1214. In step S1214, the BCPU 310 executes error processing. Specifically, an error factor is set, and the state transitions to the error state. Also here, in the actual product operation, the error processing relates to the problem how to handle an error using the content of the status acquired by the upstream HCPU 301 with the Get-Status command 503 and is not relevant to the essence of the present invention, and thus a detailed description will be omitted.

As described above, the information processing apparatus according to the present embodiment is provided with a flash memory that is divided into a plurality of areas based on characteristics of information to be stored therein. The present information processing apparatus detects a problem in data stored in each area using a different method for each area, and repairs the detected problem using a different method for each area. Furthermore, according to one aspect, the present information processing apparatus includes the first control circuit (main ASIC), and the second control circuit (sub ASIC) provided with a built-in flash memory that is controlled by the first control circuit and is divided into a plurality of areas based on characteristics of information to be stored therein. Accordingly, even if a self-diagnosis relating to a flash memory has a negative consequence, a program or secret information stored in the flash memory is automatically and appropriately repaired in a secure state, realizing a more robust system that achieves both security and user's convenience. Furthermore, when a self-repair is performed, it is possible to switch to and execute the suitable self-repair processing based on the security level, for each of the areas divided based on the level of importance of the information stored in the flash memory.

Second Embodiment

Hereinafter, a second embodiment for implementing the present invention will be described with reference to the drawings. As described in the first embodiment, it is assumed that the main ASIC including the SATA host control unit 111 and the sub ASIC of the SATA bridge control unit 112 are implemented on a controller board. In this case, even if the SATA bridge control unit (sub ASIC) 112 is normal but a failure occurs in the main ASIC or another member on the controller board after the shipment, the controller board will be typically exchanged with another one. The exchanged sub ASIC is physically different and secret information unique to each individual chip is different regardless of whether or not the chip has been initially installed. Accordingly, this means that existing data already stored in the HDD/SSDs 113 and 114 cannot be read out normally. The present invention is applicable to usage for protecting existing user data of the HDD/SSDs 113 and 114, with its function of updating (automatically repairing) secret information not only when a failure occurs in the sub ASIC but also when a failed board is exchanged.

Figure 13:
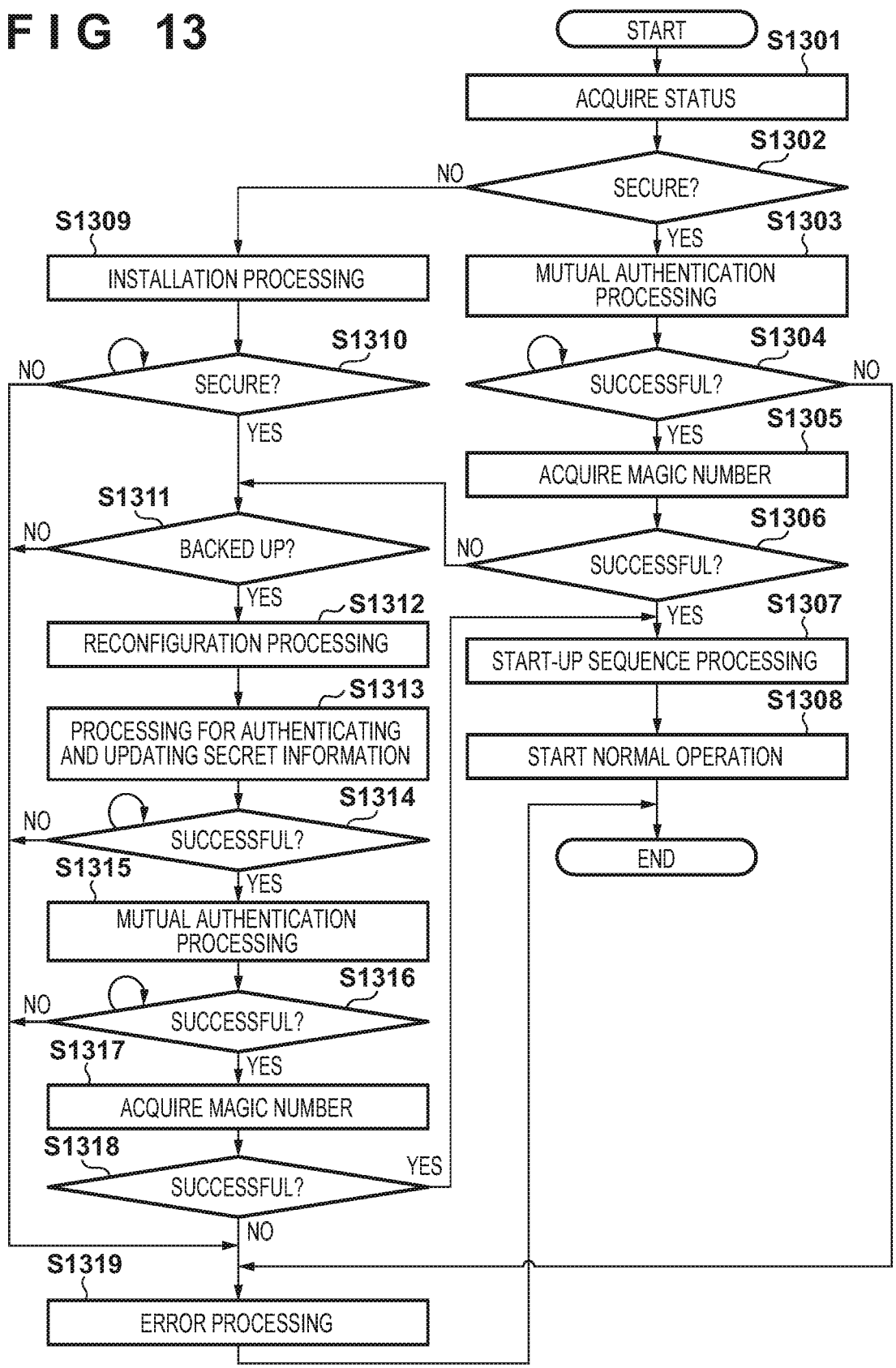
FIG. 13 is a diagram illustrating a flow of automatic repair processing when a failure has occurred in a controller board and it is exchanged according to one embodiment.

Self-Repair Processing (when a failed board is exchanged) The following will describe a flow of automatic repair processing performed when a failed controller board is exchanged according to the present embodiment, with reference to FIG. 13. Prior to explaining FIG. 13, some premises, although not shown here, will be described. First, flags indicating writing when secret information is stored in the flash memory (eMMC) 103 are provided. When polling processing is performed using the Get-Status command 503, the internal state (for example, RAID information or the like) of the SATA bridge control unit (sub ASIC) 112 is also stored in the flash memory (eMMC) 103. The flash memory (eMMC) 103 is detachable by being put together into a socket with the controller board or being formed as a sub controller board. At the time of initial installation, a magic number is stored in a portion of the address of the HDD (or SSD). The magic number that is encrypted with an encryption key generated based on secret information unique to each individual memory cannot be decrypted and read out normally without using the same encryption key. Taking the above-described premises into account, a flowchart of FIG. 13 will be described.

In step S1301, the HCPU 301 acquires the status after the start-up, and determines in step S1302 whether or not the status is a secure state. "Secure state" refers to a case where it has transitioned to the state 5: Config state 607 described with reference to FIG. 6, that is, the state to which it has transitioned after the installation was complete, a start-up self-test was performed, and an encryption key was generated based on the secret information. If the determination in step S1302 indicates that it is in a secure state, the procedure moves to step S1303, where the HCPU 301 executes mutual authentication processing, and if an authentication determination in step S1304 is successful (YES), the procedure moves to step S1305. Here, in step S1304, a loop for returning to the step itself expresses that the status is being polled in a simplified manner.

In step S1305, the HCPU 301 reads out the magic number written from the HDD (or SSD) at the time of initial installation. Then, in step S1306, the HCPU 301 can compare the read value with a magic number stored in advance in, for example, the flash memory (eMMC) 103 to determine whether or not the HDD (or SSD) is paired with the correct encryption key. If the determination in step S1306 was successful (YES), the HCPU 301 executes start-up sequence processing in step S1307, and starts a normal operation in step S1308.

On the other hand, if the determination in step S1302 results in NO, it is determined to be in a non-secure state, and the procedure moves to step S1309, where the HCPU 301 executes installation processing. When the status acquired in step S1310 has transitioned to a secure state (YES), then the procedure moves to step S1311. In step S1311, the HCPU 301 determines whether or not secret information has been backed up in the flash memory (eMMC) 103. Although not shown here, as described with respect to the premises, flag values indicating that secret information was written into a backup area are checked.

If the result of the determination in step S1311 indicates that secret information has been backed up (YES), the procedure moves to step S1312. In step S1312, the HCPU 301 performs processing for reconfiguring the internal status backed up in advance as described in the premise, using a setup-related extended command for the SATA bridge control unit (sub ASIC) 112, which is not shown here. Then, in step S1313, the HCPU 301 executes processing for authenticating and updating the secret information. The authentication/update of the secret information is shown by simplifying the pieces of processing already described with reference to FIGS. 11 and 12.

Then, if update determination based on the status in step S1314 is successful (YES), the procedure moves to step S1315. In step S1315, the HCPU 301 executes mutual authentication processing. Also the mutual authentication processing has already been described with reference to FIGS. 7 and 8, and thus details thereof are omitted. If the determination in step S1316 indicates that the mutual authentication was successful (YES), the procedure moves to step S1317. In step S1317, the HCPU 301 reads out the magic number stored in a predetermined position in the HDD or SSD at the time of initial installation. In step S1318, the HCPU 301 compares the read value with the magic number stored in advance to determine whether or not the HDD (or SSD) is paired with the correct encryption key. If the determination in step S1318 indicates that the magic number has been successfully read out (YES), the procedure moves to steps S1307 and S1308, which have already been described, and a normal operation is started.

On the other hand, if the determination in step S1306 based on the read magic number was not successful (NO), the procedure moves to step S1311, where the HCPU 301 executes parameter reconfiguration, and processing for authenticating and updating the secret information. The procedure from steps S1311 onwards has already been described, and thus is omitted. Furthermore, if the determinations in steps S1310, S1311, S1314, S1316, and S1318 have failed (NO), the procedure moves to step S1319. In step S1319, the HCPU 301 executes error processing. The error processing relates to the problem how to handle an error in the actual product operation such as a series of retry processing, and is not relevant to the essence of the present invention, and thus a detailed description will be omitted.

As described above, according to the present embodiment, even if a failure occurs in a member or a circuit other than the SATA bridge control unit 112 (sub ASIC) and the board is exchanged with another one, the member or the circuit can be automatically repaired regardless of whether or not a sub ASIC mounted on the exchanged board has been subjected to installation processing. Accordingly, it is possible to rescue existing data stored in an HDD or SSD to which the failed board is connected prior to the failure occurring.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-181474 filed on Sep. 21, 2017, which is hereby incorporated by reference herein in its entirety.

What is claimed is:

1. An information processing apparatus comprising:
a flash memory that includes a plurality of areas based on characteristics of information to be stored therein, wherein the plurality of areas includes at least a first area in which unique secret information for the information processing apparatus is stored and a second area in which a plurality of history information indicating a status of the information processing apparatus at startup are stored;
a memory device that stores a set of instructions;
a first CPU (central processing unit) that executes the set of instructions stored in the memory device to detect an error of data stored in the first area; and
a second CPU that detects an error of data stored in the second area,
wherein the second CPU performs a first method for the error of data related to the secret information in the first area, and performs a second method for the error of data related to the history information, the second method is a method for the second CPU using information in which no error is detected in the history information based on detecting an error in a part of the history information stored in the second area when starting the information processing device, and
the first method is a method for the second CPU performing an authentication based on authentication information and stores secret information in a case where the authentication is successful.

2. The information processing apparatus according to claim 1, wherein
the second area is a ring buffer.

3. The information processing apparatus according to claim 2, wherein
a beginning flag is written at a position in the ring buffer at which information writing begins, and an ending flag is written at a position at which information writing has ended, and
the second CPU detects an error of data stored in the second area by determining whether or not a beginning flag and an ending flag have been normally written.

4. The information processing apparatus according to claim 2, wherein
the second area is a parameter area in which, when the information processing apparatus is shut down, parameters needed to decide a status after the next start are stored, the parameter area serving as the ring buffer.

5. The information processing apparatus according to claim 1, wherein
the first area includes a third area in which the secret information is stored, and a fourth area in which secret information corresponding to the secret information is stored.

6. The information processing apparatus according to claim 1, further comprising:
a first module that includes the first CPU and the memory device; and
a second module that includes the second CPU and the flash memory,
wherein the first module sends secret information together with the authentication information to the second module.

7. The information processing apparatus according to claim 1, wherein
the first CPU determines whether or not a processing corresponding to an error of data stored in the second area can be executed, and causes the second CPU to perform the second method in a case where it is determined that the processing can be executed.

8. The information processing apparatus according to claim 1, wherein
the first CPU detects an error of data stored in the first area using an error-detecting code.

9. The information processing apparatus according to claim 1, further comprising
a first module that includes the first CPU and the memory device; and
a second module that includes the second CPU and the flash memory,
wherein the flash memory includes a fifth area in which a program is stored with a digital signature, and
the second CPU detects an error of data stored in the fifth area based on the digital signature.

10. The information processing apparatus according to claim 9, wherein the fifth area includes a sixth area in which the program is stored, and a seventh area in which a program received from a different chip is stored to repair the program in the third area.

11. The information processing apparatus according to claim 9, wherein
the second module accepts the program from the first module, and upon detecting an error of data stored in the fifth area, the second CPU authenticates the first module based on the digital signature, and stores the program received from the first module in the fifth area in a case where the authentication is successful.

12. An information processing apparatus comprising:
a first control circuit;
a second control circuit that is controlled by the first control circuit and is provided with a built-in flash memory divided into a plurality of areas based on characteristics of information to be stored therein;
a detection unit that detects a problem in data stored in each area of the built-in flash memory using a different method for each area; and
a repair unit that repairs the problem detected by the detection unit using a different method for each area, wherein
the detection unit and the repair unit are switched between a configuration of being realized only by the second control circuit, and a configuration of being realized by the first control circuit and the second control circuit, depending on the area of the built-in flash memory.

13. The information processing apparatus according to claim 12, wherein
the first control circuit and the second control circuit are mounted on the same board,
the information processing apparatus further comprises:
a unit that stores, in an external storage device connected to the board, a magic number encrypted using an encryption key generated based on secret information unique to the individual information processing apparatus, and
the detection unit and the repair unit execute processing using the magic number stored in the external storage device, when the board is exchanged due to a failure in the board.

14. A method for controlling an information processing apparatus including a first control circuit, and a second control circuit that is controlled by the first control circuit and is provided with a built-in flash memory divided into a plurality of areas based on characteristics of information to be stored therein, comprising:
detecting a problem in data stored in each area of the built-in flash memory, using a different method for each area; and
repairing the problem detected in the detecting, using a different method for each area,
wherein the detecting and the repairing are switched between a configuration of being realized only by the second control circuit, and a configuration of being realized by the first control circuit and the second control circuit, depending on the area of the built-in flash memory.

15. A non-transitory computer-readable storage medium storing a computer program for causing a computer to execute the method for controlling an information processing apparatus including a first control circuit, and a second control circuit that is controlled by the first control circuit and is provided with a built-in flash memory divided into a plurality of areas based on characteristics of information to be stored therein, the method comprising:
detecting a problem in data stored in each area of the built-in flash memory, using a different method for each area; and
repairing the problem detected in the detecting, using a different method for each area,
wherein the detecting and the repairing are switched between a configuration of being realized only by the second control circuit, and a configuration of being realized by the first control circuit and the second control circuit, depending on the area of the built-in flash memory.

\* \* \* \* \*